(12) United States Patent
Murata

(10) Patent No.: US 9,981,693 B2
(45) Date of Patent: May 29, 2018

(54) FUEL CELL VEHICLE

(71) Applicant: TOYOTA JIDOSHA KABUSHIKI KAISHA, Toyota-shi, Aichi-ken (JP)

(72) Inventor: Shigeaki Murata, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 15/245,420

(22) Filed: Aug. 24, 2016

(65) Prior Publication Data

US 2017/0066479 A1   Mar. 9, 2017

(30) Foreign Application Priority Data

Sep. 4, 2015   (JP) ................................. 2015-174483

(51) Int. Cl.
*B62D 21/15* (2006.01)
*B60K 1/04* (2006.01)
(Continued)

(52) U.S. Cl.
CPC .............. *B62D 21/15* (2013.01); *B60K 1/04* (2013.01); *B60K 15/07* (2013.01); *H01M 8/04201* (2013.01); *B60K 2001/005* (2013.01); *B60K 2001/0411* (2013.01); *B60K 2015/03315* (2013.01); *B60K 2015/0634* (2013.01); *B60K 2015/0635* (2013.01); *B60Y 2200/91* (2013.01);
(Continued)

(58) Field of Classification Search
CPC .......... B62D 21/15; B60K 1/04; B60K 15/07; B60K 2001/005; B60K 2001/0411; B60K 2015/0634; H01M 8/04201; H01M 2250/20; B60Y 2200/91; B60Y 2306/01; Y02T 90/32
See application file for complete search history.

(56) References Cited

U.S. PATENT DOCUMENTS 9,260,034 B2 *   2/2016   Naito ..................... B60L 3/0007
9,789,755 B2 *   10/2017   Aishima .................. B60K 1/04
(Continued)

FOREIGN PATENT DOCUMENTS

JP   2011-162108   8/2011
JP   2013-112271   6/2013

*Primary Examiner* — Faye M Fleming
(74) *Attorney, Agent, or Firm* — Finnegan, Henderson, Farabow, Garrett & Dunner, LLP

(57) ABSTRACT

A fuel cell vehicle comprises a front room; a vehicle interior; a fuel cell in the front room; a center tunnel; a tank that is at least partly placed in the center tunnel and stores a gas to be supplied to the fuel cell; and a dashboard that separates the front room from the vehicle interior, wherein the fuel cell is placed above the tank such that a profile of the fuel cell does not overlap with a center axis of the tank, the dashboard has an overlapping portion arranged to overlap with a rear portion of the fuel cell and that is located behind a front end of the tank, at least part of a remaining portion of the dashboard other than the overlapping portion is placed flush with the front end of the tank in a vehicle longitudinal direction or is placed in front of the front end of the tank, and in a normal state, a receiving space is provided between a rear end of the fuel cell and the overlapping portion and is configured to allow at least part of the rear portion of the fuel cell to be moved to behind the front end of the tank when the front collision occurs.

8 Claims, 11 Drawing Sheets

(51) Int. Cl.
*H01M 8/04082* (2016.01)
*B60K 15/07* (2006.01)
*B60K 15/03* (2006.01)
*B60K 1/00* (2006.01)
*B60K 15/063* (2006.01)

(52) U.S. Cl.
CPC ...... *B60Y 2306/01* (2013.01); *H01M 2250/20* (2013.01); *Y02T 90/32* (2013.01)

(56) References Cited

U.S. PATENT DOCUMENTS

| | | |
|---|---|---|
| 2005/0161934 A1 | 7/2005 | Rife et al. |
| 2014/0110185 A1 | 4/2014 | Naito et al. |
| 2016/0297290 A1* | 10/2016 | Murata .................... B60K 1/04 |

* cited by examiner

Fig.5 (IN THE EVENT OF FRONT COLLISION)

Fig.6 COMPARATIVE EXAMPLE (IN NORMAL STATE)

SECOND EMBODIMENT
(IN THE EVENT OF FRONT COLLISION)

FUEL CELL VEHICLE

CROSS-REFERENCE TO RELATED APPLICATIONS

The present application claims priority from Japanese patent application P2015-174483 filed on Sep. 4, 2015, the content of which is hereby incorporated by reference into this application.

BACKGROUND

Field

The present disclosure relates to a fuel cell vehicle with a fuel cell mounted thereon.

Related Art

In a proposed configuration of a fuel cell vehicle, a fuel cell is placed in a front room and is moved rearward and downward in the event of a front collision of the fuel cell vehicle, so as to suppress the fuel cell from entering a vehicle interior (JP 2013-112271A).

In a configuration that a tank provided to store a gas that is to be supplied to the fuel cell, for example, hydrogen gas, is placed in a center tunnel provided under the floor of the fuel cell vehicle, however, moving the fuel cell rearward and downward in the event of a front collision makes the fuel cell likely to hit against the tank and deform the tank. In the case where the fuel cell is moved rearward along a horizontal direction, i.e., in the case where the fuel cell is moved to above the tank, the fuel cell is likely to enter the vehicle interior beyond a dashboard provided to separate the front room from the vehicle interior.

This problem may also arise in a configuration that an auxiliary machine, for example, various pumps and a voltage converter, is placed behind the fuel cell. In the event of a front collision, the auxiliary machine is likely to hit against the tank and deform the tank. The auxiliary machine is also likely to enter the vehicle interior beyond the dashboard. In a fuel cell vehicle having a fuel cell and an auxiliary machine mounted in a front room, there is accordingly a need for a technique that suppresses the fuel cell and the auxiliary machine from entering the vehicle interior in the event of a front collision.

SUMMARY

In order to solve at least part of the above problems, the disclosure may be implemented by any of the following aspects.

(1) According to a first aspect of the disclosure, there is provided a fuel cell vehicle that is configured to include a front room and a vehicle interior. The fuel cell vehicle of the first aspect comprises a fuel cell that is placed in the front room; a center tunnel that is provided under floor of the fuel cell vehicle; a tank that is at least partly placed in the center tunnel and is configured to store a gas that is to be supplied to the fuel cell; and a dashboard that is configured to separate the front room from the vehicle interior, wherein the fuel cell is placed above the tank such that a profile of the fuel cell does not overlap with a center axis of the tank when the fuel cell vehicle is viewed from a vehicle front side, the dashboard has an overlapping portion that is arranged to overlap with a rear portion of the fuel cell when the fuel cell vehicle is viewed from the vehicle front side and that is located behind a front end of the tank, at least part of a remaining portion of the dashboard other than the overlapping portion is placed flush with the front end of the tank in a vehicle longitudinal direction or is placed in front of the front end of the tank, and in a normal state without a collision, a receiving space is provided between a rear end of the fuel cell and the overlapping portion of the dashboard and is configured to allow at least part of the rear portion of the fuel cell to be moved to behind the front end of the tank in the event of a front collision of the fuel cell vehicle. In the fuel cell vehicle of this aspect, the receiving space is provided between the rear end of the fuel cell and the overlapping portion of the dashboard in the normal state. This configuration allows at least part of the rear portion of the fuel cell to be moved and received into the receiving space, in the event of a front collision. The friction during motion or the like reduces the force of the motion of the fuel cell and suppresses the fuel cell from entering the vehicle interior beyond the dashboard. In this state, at least part of the rear portion of the fuel cell is moved to behind the front end of the tank. This suppresses the fuel cell from hitting against the tank and thereby suppresses deformation of the tank in the event of a front collision. The remaining portion of the dashboard other than the overlapping portion is placed flush with the front end of the tank in the vehicle longitudinal direction or is placed in front of the front end of the tank. This configuration suppresses the vehicle interior from being narrowed.

(2) The fuel cell vehicle of the above aspect may further comprise a reinforcement member that is placed on a front room side to be adjacent to the dashboard. The reinforcement member may be disposed not to overlap with the rear portion of the fuel cell when the fuel cell vehicle is viewed from the vehicle front side. In the fuel cell vehicle of this aspect, the reinforcement member is placed not to overlap with the rear portion of the fuel cell when the fuel cell vehicle is viewed from the vehicle front side. This configuration suppresses the reinforcement member from interfering with rearward motion of at least part of the rear portion of the fuel cell in the event of a front collision, while reinforcing the dashboard.

(3) According to a second aspect of the disclosure, there is provided a fuel cell vehicle that is configured to include a front room and a vehicle interior. The fuel cell vehicle of the second aspect comprises a fuel cell that is placed in the front room; a first auxiliary machine that is placed behind the fuel cell in the front room; a center tunnel that is provided under floor of the fuel cell vehicle; a tank that is at least partly placed in the center tunnel and is configured to store a gas that is to be supplied to the fuel cell; and a dashboard that is configured to separate the front room from the vehicle interior, wherein the first auxiliary machine and the tank are disposed such that a profile of the first auxiliary machine does not overlap with a center axis of the tank when the fuel cell vehicle is viewed from a vehicle front side, the dashboard has an overlapping portion that is arranged to overlap with a rear portion of the first auxiliary machine when the fuel cell vehicle is viewed from the vehicle front side and that is located behind a front end of the tank, at least part of a remaining portion of the dashboard other than the overlapping portion is placed flush with the front end of the tank in a vehicle longitudinal direction or is placed in front of the front end of the tank, and in a normal state without a collision, a receiving space is provided between a rear end of the first auxiliary machine and the overlapping portion of the dashboard and is configured to allow at least part of the rear portion of the first auxiliary machine to be moved to behind the front end of the tank in the event of a front collision of the fuel cell vehicle. In the fuel cell vehicle of this aspect, the receiving space is provided between the rear end of the first auxiliary machine and the overlapping portion of the dashboard in the normal state. This configuration allows at least part of the rear portion of the first auxiliary machine to be moved and received into the receiving space, in the event of a front collision. The friction during motion or the like reduces the force of the motion of the first auxiliary machine and suppresses the first auxiliary machine from entering the vehicle interior beyond the dashboard. In this state, at least part of the rear portion of the first auxiliary machine is moved to behind the front end of the tank. This suppresses the first auxiliary machine from hitting against the tank and thereby suppresses deformation of the tank in the event of a front collision. The remaining portion of the dashboard other than the overlapping portion is placed flush with the front end of the tank in the vehicle longitudinal direction or is placed in front of the front end of the tank. This configuration suppresses the vehicle interior from being narrowed.

(4) The fuel cell vehicle of the above aspect may further comprise a reinforcement member that is placed on a front room side to be adjacent to the dashboard. The reinforcement member may be disposed not to overlap with the rear portion of the first auxiliary machine when the fuel cell vehicle is viewed from the vehicle front side. In the fuel cell vehicle of this aspect, the reinforcement member is placed not to overlap with the rear portion of the first auxiliary machine when the fuel cell vehicle is viewed from the vehicle front side. This configuration suppresses the reinforcement member from interfering with rearward motion of at least part of the rear portion of the first auxiliary machine in the event of a front collision, while reinforcing the dashboard.

(5) The fuel cell vehicle of the above aspect may further comprise a second auxiliary machine that is placed above the fuel cell to be adjacent to the fuel cell; and a third auxiliary machine that is placed under the fuel cell to be adjacent to the fuel cell. In the fuel cell vehicle of this aspect, the second auxiliary machine is placed above the fuel cell to be adjacent to the fuel cell, and the third auxiliary machine is placed under the fuel cell to be adjacent to the fuel cell. This configuration ensures a larger crushable zone in the front room to provide for a front collision, compared with a configuration that the second and the third auxiliary machines are placed in front of or behind the fuel cell.

(6) In the fuel cell vehicle of the above aspect, the third auxiliary machine may have a total weight greater than a total weight of the second auxiliary machine. In the fuel cell vehicle of this aspect, the third auxiliary machine having the greater total weight is placed under the second auxiliary machine. This configuration lowers the center of gravity of the fuel cell vehicle and improves the driving stability.

The disclosure may be implemented by any of various aspects other than the aspects of the fuel cell vehicle described above, for example, a dashboard for fuel cell vehicle, a manufacturing method of the fuel cell vehicle and a layout method of a fuel cell in the fuel cell vehicle.

DESCRIPTION OF EMBODIMENTS

A. First Embodiment

A1. Apparatus Configuration

Figure 1:
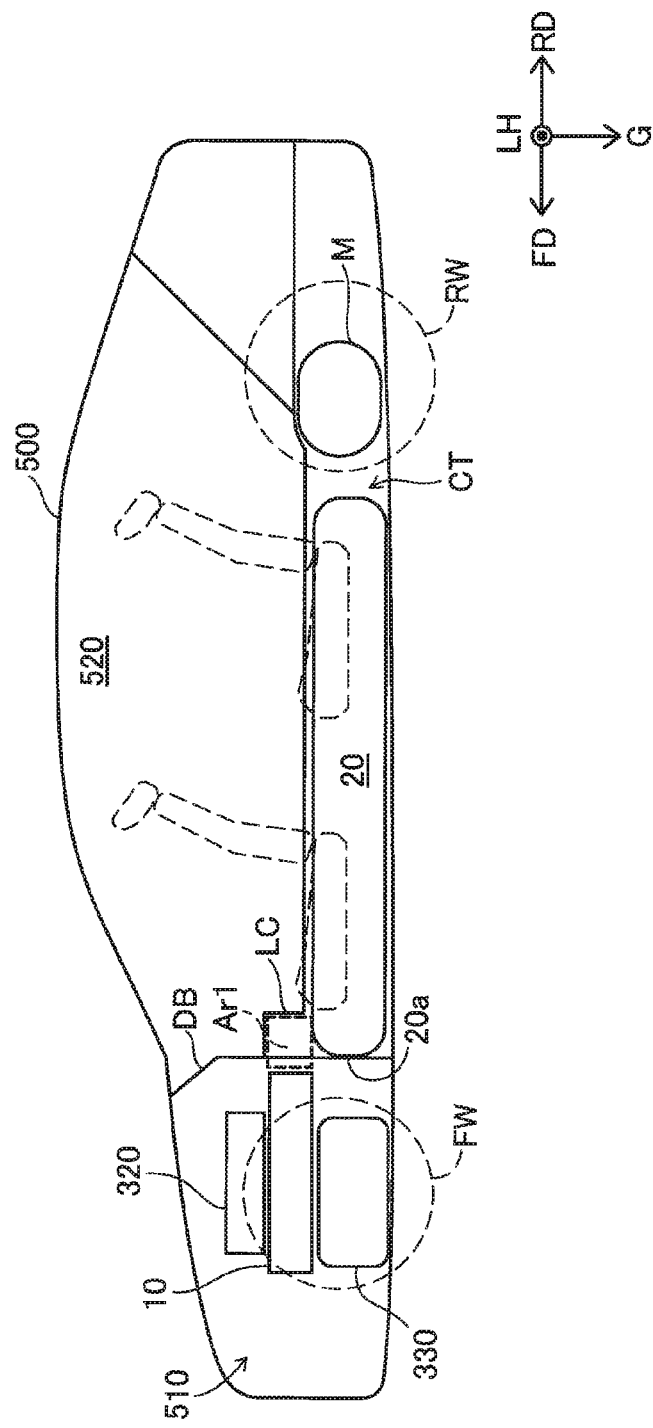
FIG. 1 is a sectional view illustrating the schematic configuration of a fuel cell vehicle according to one embodiment of the disclosure.

FIG. 1 is a sectional view illustrating the schematic configuration of a fuel cell vehicle 500 according to one embodiment of the disclosure. FIG. 1 illustrates a section of the fuel cell vehicle 500 along a forward direction FD and a rearward direction RD of the vehicle at a center position in a vehicle width direction LH in the normal state without a collision. In the description hereafter, the forward direction FD and the rearward direction RD may be collectively referred to as "vehicle longitudinal direction". The fuel cell vehicle 500 has a fuel cell (fuel cell 10 described later) mounted thereon as an electric power supply and a motor M provided as a power source and driven to drive rear wheels RW.

A front room 510 is provided on a front side of the fuel cell vehicle 500. According to this embodiment, the front room 510 is configured as a space including an area placed between a pair of front wheels FW. A vehicle interior 520 is provided behind the front room 510. According to this embodiment, the vehicle interior 520 is configured as a space placed between the pair of front wheels FW and the pair of rear wheels RW and extended in the vehicle longitudinal direction.

A center tunnel CT is provided under the floor of the vehicle interior 520. The center tunnel CT is configured as a space placed at an approximate center in the vehicle width direction LH and extended in the vehicle longitudinal direction of the fuel cell vehicle 500. A ceiling portion of the center tunnel CT is provided by a floor panel of the vehicle interior 520. A portion of the floor of the vehicle interior 520 corresponding to the center tunnel CT is protruded vertically upward from the remaining portion of the floor. The center tunnel CT accordingly has the similar configuration to that of a center tunnel in which a driveshaft is placed in a conventional vehicle equipped with an engine. A tank 20, wire harnesses and the like are placed in the center tunnel CT. The details of the tank 20 will be described later.

The front room 510 is separated from the vehicle interior 520 by a dashboard DB. The dashboard DB is formed from a plate-like member and has an upper portion that is bent forward. More specifically, the dashboard DB has a lower portion that is arranged approximately parallel to a vertical direction G and the upper portion that is arranged to face the forward direction FD toward its upper end. A floor panel of the dashboard DB (i.e., a portion to be joined with the ceiling portion of the center tunnel CT) at the approximate center in the vehicle width direction LH of the fuel cell vehicle 500 is placed along the rearward direction RD (in other words, placed to be protruded toward the vehicle interior 520). This portion of the dashboard DB corresponds to a portion that overlaps with a rear portion of the fuel cell 10 (hereinafter referred to as "overlapping portion") when the fuel cell vehicle 500 is viewed from a vehicle front side. Protruding the overlapping portion LC in the rearward direction RD causes a receiving space Ar1 to be provided between a rear end of the fuel cell 10 and the overlapping portion LC in the front room 510. The receiving space Ar1 is configured to receive at least part of the rear portion of the fuel cell 10 therein in the event of a front collision of the fuel cell vehicle 500 and to allow this part of the rear portion of the fuel cell 10 to be moved to behind a front end 20a of the tank 20. According to this embodiment, the receiving space Ar1 is formed to have a size that allows 10% of the entire length in the vehicle longitudinal direction of the fuel cell 10 to be placed therein in the normal state. The size of the receiving space Ar1 is not limited to the size that allows 10% of the entire length of the fuel cell 10 to be placed but may be a size that allows any ratio of the entire length of the fuel cell 10 to be placed. For example, the receiving space Ar1 may be formed to have a size that allows a portion in a range of not less than 5% but less than 10% of the entire length in the vehicle longitudinal direction of the fuel cell 10 to be placed therein. This ratio is, however, preferably not less than 10%.

At least part of components constituting a fuel cell system described later are placed in the front room 510. FIG. 1 illustrates the fuel cell 10, a second auxiliary machine 320 and a third auxiliary machine 330 as examples of such components. A first auxiliary machine that is not illustrated in FIG. 1 will be described later with reference to a second embodiment. The second auxiliary machine 320 is placed above the fuel cell 10 to be adjacent to the fuel cell 10. The third auxiliary machine 330 is placed under the fuel cell 10 to be adjacent to the fuel cell 10. The second auxiliary machine 320 and the third auxiliary machine 330 are both joined with the fuel cell 10 by means of connectors such as bolts. The fuel cell 10, the second auxiliary machine 320 and the third auxiliary machine 330 are stacked along the vertical direction G. This configuration reduces the total length of these devices 10, 320 and 330 in the vehicle longitudinal direction and thereby ensures a large crushable zone in the front room 510 to provide for a front collision. The details of the second auxiliary machine 320 and the third auxiliary machine 330 will be described later.

Figure 2:
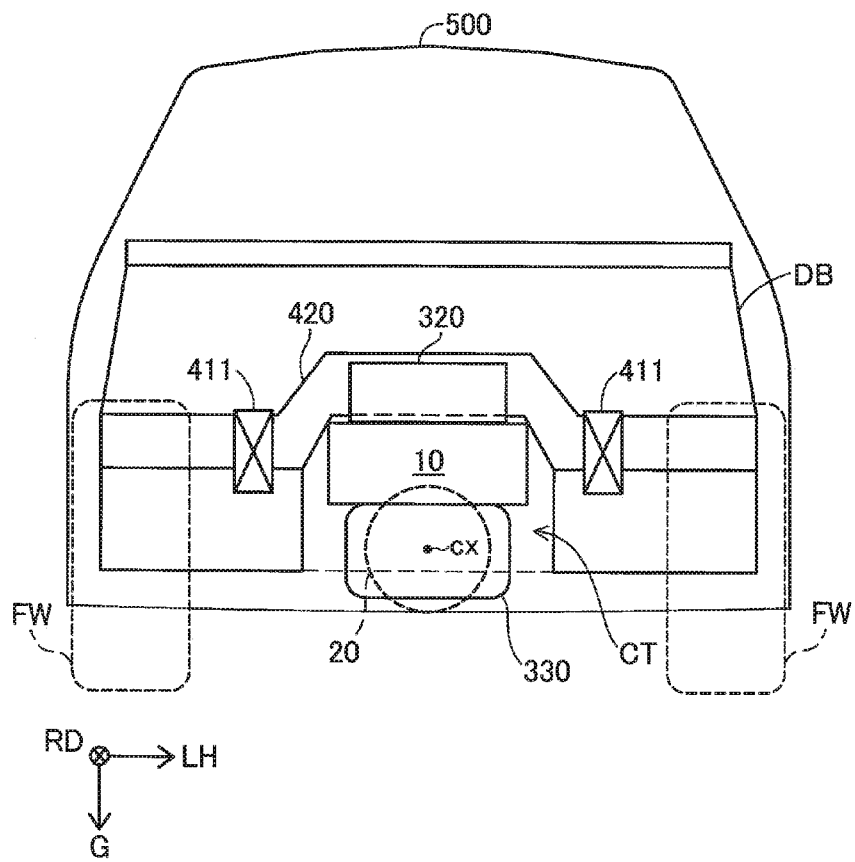
FIG. 2 is a schematic transparent view illustrating the fuel cell vehicle viewed from a vehicle front side.

FIG. 2 is a schematic transparent view illustrating the fuel cell vehicle 500 viewed from the vehicle front side. The transparent view of FIG. 2 illustrates inside of the front room 510 when the fuel cell vehicle 500 is viewed in the rearward direction RD from the vehicle front side.

As shown in FIG. 2, a reinforcement member 420 is placed adjacent to the dashboard DB in the front room 510. The reinforcement member 420 is a thin plate-like member that has its longitudinal direction arranged along the vehicle width direction LH and is extended to pass through a pair of side members 411. The reinforcement member 420 serves as a reinforcement to enhance the rigidity in the vehicle width direction LH of the fuel cell vehicle 500. An approximate center portion of the reinforcement member 420 in the vehicle width direction LH is bent upward. This configuration causes the reinforcement member 420 not to overlap with the rear portion of the fuel cell 10 when the fuel cell vehicle 500 is viewed from the vehicle front side. This configuration suppresses the reinforcement member 420 from interfering with rearward motion of the fuel cell 10 in the event of a front collision. The reinforcement member 420 is omitted from the illustration of FIG. 1.

The fuel cell 10 and the tank 20 are placed such that the profile of the fuel cell 10, i.e., the contour of the fuel cell 10 and an area surrounded by the contour, does not overlap with a center axis cx of the tank 20 when the fuel cell vehicle 500 is viewed from the vehicle front side. In the fuel cell vehicle 500, this configuration suppresses the fuel cell 10 from strongly hitting against the tank 20 when the fuel cell 10 is moved rearward in the event of a front collision.

Figure 3:
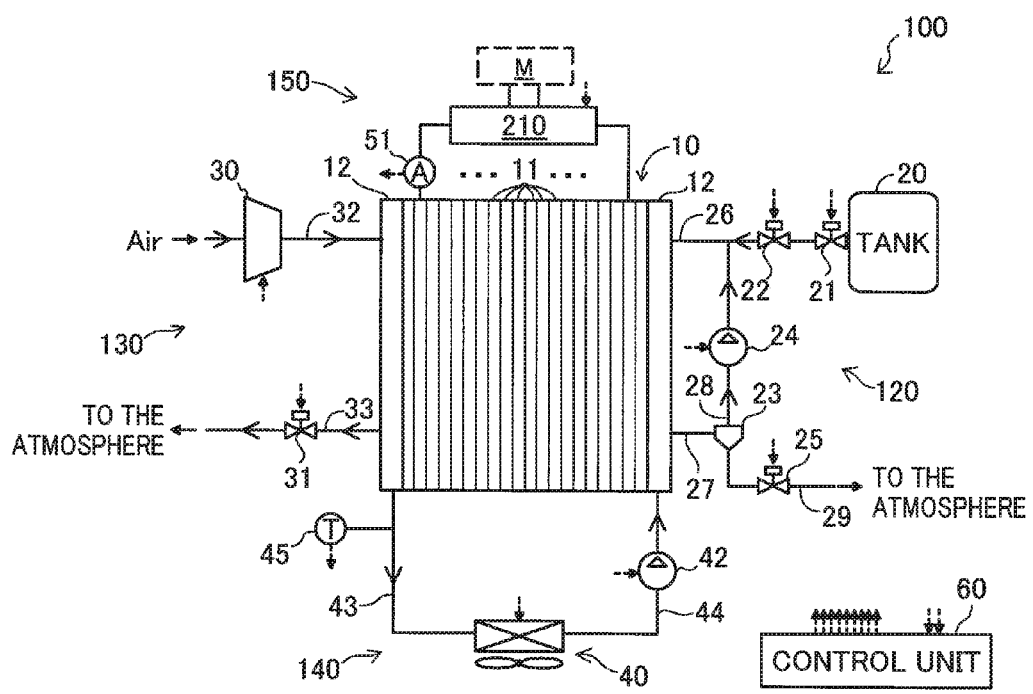
FIG. 3 is a block diagram illustrating the schematic configuration of a fuel cell system mounted on the fuel cell vehicle.

FIG. 3 is a block diagram illustrating the schematic configuration of a fuel cell system 100 mounted on the fuel cell vehicle 500. The fuel cell system 100 includes a fuel gas supply discharge system 120, an oxidizing gas supply discharge system 130, a cooling medium circulation system 140, a power supply system 150 and a control unit 60, in addition to the fuel cell 10 described above.

The fuel cell 10 is a polymer electrolyte fuel cell and includes a plurality of unit cells 11 that are stacked along a predetermined direction, a pair of current collectors (not shown) serving as total electrodes, and a pair of end plates 12 placed outside of the respective ends of a stacked body that is comprised of the plurality of unit cells 11 and the pair of current collectors, so as to keep the stacked configuration of the stacked body. Each unit cell 11 generates electric power by electrochemical reaction of a fuel gas and an oxidizing gas that are respectively supplied to an anode-side catalyst electrode layer and a cathode-side catalyst electrode layer which are provided across a solid polymer electrolyte membrane. According to this embodiment, the fuel gas is hydrogen gas, and the oxidizing gas is the air. According to this embodiment, the stacking direction of the unit cells 11 is parallel to the vehicle longitudinal direction. The catalyst electrode layer is configured to include carbon particles with a catalyst such as platinum (Pt) supported thereon and an electrolyte. Gas diffusion layers made of a porous material are placed outside of the anode-side and cathode-side catalyst electrode layers in the unit cell 11. The porous material used herein may be, for example, a carbon porous material such as carbon paper or carbon cloth or a metal porous material such as metal mesh or metal foam. Manifolds (not shown) which the fuel gas, the oxidizing gas and a cooling medium flow through are formed inside of the fuel cell 10 along the stacking direction of the unit cells 11. The fuel cell 10 is not limited to the polymer electrolyte fuel cell but may be any of various other types of fuel cells, for example, a solid oxide fuel cell.

The fuel gas supply discharge system 120 is configured to supply and discharge the fuel gas to and from the fuel cell 10. The fuel gas supply discharge system 120 includes a shutoff valve 21, an injector 22, a gas liquid separator 23, a circulation pump 24, a purge valve 25, a fuel gas supply passage 26, a first fuel gas discharge passage 27, a fuel gas circulation passage 28 and a second fuel gas discharge passage 29, in addition to the tank 20 described above.

The tank 20 is configured to store high-pressure hydrogen and supply the hydrogen gas as the fuel gas through the fuel gas supply passage 26 to the fuel cell 10. As shown in FIG.

1, the tank 20 has an approximately cylindrical outer shape. An upper portion of the tank 20 is mostly placed in the center tunnel CT, while part of a lower portion of the tank 20 is exposed outside of the center tunnel CT. The geometry of the tank 20 will be described later more in detail. The shutoff valve 21 is placed near to a discharge port of the fuel gas in the tank 20 to change over between supply of the hydrogen gas from the tank 20 and stop of the supply. The injector 22 is placed in the fuel gas supply passage 26 to regulate the supply amount (flow rate) and the pressure of the hydrogen gas that is to be supplied to the fuel cell 10. The gas liquid separator 23 is placed in the first fuel gas discharge passage 27 to separate water from an off gas discharged from the fuel cell 10 and discharge the separated water to the second fuel gas discharge passage 29 while discharging the resulting gas after separation of water (fuel gas) to the fuel gas circulation passage 28. The circulation pump 24 is placed in the fuel gas circulation passage 28 to supply the fuel gas discharged from the gas liquid separator 23 to the fuel gas supply passage 26. The purge valve 25 is placed in the second fuel gas discharge passage 29 and is opened to allow the water separated by the gas liquid separator 23 to be discharged to the atmosphere.

The oxidizing gas supply discharge system 130 is configured to supply and discharge the oxidizing gas to and from the fuel cell 10. The oxidizing gas supply discharge system 130 includes an air compressor 30, a back pressure valve 31, an oxidizing gas supply passage 32 and an oxidizing gas discharge passage 33. The air compressor 30 compresses the intake air taken in from the atmosphere and supplies the compressed air to the oxidizing gas supply passage 32. The back pressure valve 31 is placed in the oxidizing gas discharge passage 33 to regulate the cathode discharge-side pressure (back pressure) of the fuel cell 10.

The cooling medium circulation system 140 is configured to circulate the cooling medium through the fuel cell 10 and thereby regulate the temperature of the fuel cell 10. The cooling medium circulation system 140 includes a radiator 40, a cooling medium discharge passage 43, a cooling medium supply passage 44, a circulation pump 42 and a temperature sensor 45. The radiator 40 is connected with the cooling medium discharge passage 43 and the cooling medium supply passage 44 to cool down the cooling medium flowing in from the cooling medium discharge passage 43 by, for example, the air blown from a power-driven fan and discharge the cooled-down cooling medium to the cooling medium supply passage 44. The cooling medium discharge passage 43 is connected with a cooling medium discharge manifold provided in the fuel cell 10, and the cooling medium supply passage 44 is connected with a cooling medium supply manifold provided in the fuel cell 10. Accordingly the cooling medium discharge passage 43, the radiator 40, the cooling medium supply passage 44 and the manifolds in the fuel cell 10 form a circulation passage of the cooling medium. The temperature sensor 45 is placed near to the fuel cell 10 in the cooling medium discharge passage 43 to measure the temperature of the cooling medium discharged from the fuel cell 10 and output a signal indicating the measured temperature.

The power supply system 150 supplies electric power output from the fuel cell 10 to the motor M described above. The power supply system 150 includes a DC-DC converter 210 and an ammeter 51. The DC-DC converter 210 is electrically connected with the current collectors (not shown) of the fuel cell 10 to control the output voltage of the fuel cell 10. The ammeter 51 is provided to measure the current value of the fuel cell 10.

The control unit 60 is electrically connected with the air compressor 30, the two circulation pumps 24 and 42, the radiator 40, the DC-DC converter 210 and the four valves 21, 22, 25 and 31 to control these components. The control unit 60 includes a CPU (central processing unit), a ROM (read only memory) and a RAM (random access memory) (not shown). The CPU executes control programs stored in the ROM to serve as a controller of controlling the respective functional modules.

According to this embodiment, the second auxiliary machine 320 shown in FIGS. 1 and 2 is configured by the DC-DC converter 210. The third auxiliary machine 330 shown in FIGS. 1 and 2 is configured by the two circulation pumps 24 and 42. According to this embodiment, the total weight of the third auxiliary machine 330 is greater than the total weight of the second auxiliary machine 320. This configuration lowers the center of gravity of the fuel cell vehicle 500 and improves the driving stability.

Figure 4:
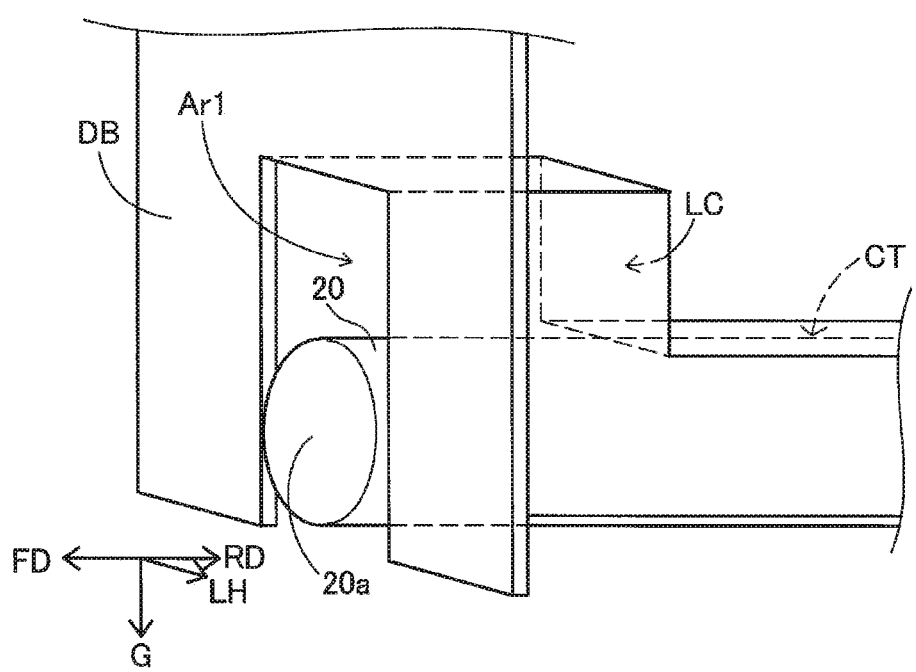
FIG. 4 is a schematic perspective view illustrating the configuration in the neighborhood of a receiving space in close-up.

FIG. 4 is a schematic perspective view illustrating the configuration in the neighborhood of the receiving space Ar1 in close-up. The reinforcement member 420 is omitted from the illustration of FIG. 4. The upper portion of the dashboard DB, the center tunnel CT and the rear portion of the tank 20 are also omitted from the illustration of FIG. 4. The fuel cell 10, the second auxiliary machine 320 and the third auxiliary machine 330 are further omitted from the illustration of FIG. 4. As shown in FIGS. 2 and 4, the lower portion of the tank 20 is exposed under the center tunnel CT along the vehicle longitudinal direction.

The overlapping portion LC of the dashboard DB is protruded in the rearward direction RD, compared with the remaining portion of the dashboard DB. The overlapping portion LC is located behind the front end 20a of the tank 20. A lower surface of the dashboard DB is flush with the front end 20a of the tank 20 in the vehicle longitudinal direction. An upper surface (not shown) (i.e., surface that is inclined forward) of the dashboard DB is located in front of the front end 20a of the tank 20. The configuration that the remaining portion of the dash board DB other than the overlapping portion LC is placed flush with the front end 20a of the tank 20 in the vehicle longitudinal direction or is placed in front of the front end 20a of the tank 20 suppresses the vehicle interior 520 from being narrowed, compared with a configuration that the entire dashboard DB is placed behind in the rearward direction RD.

A2. Motion of Fuel Cell 10 in the Event of Front Collision

Figure 5:
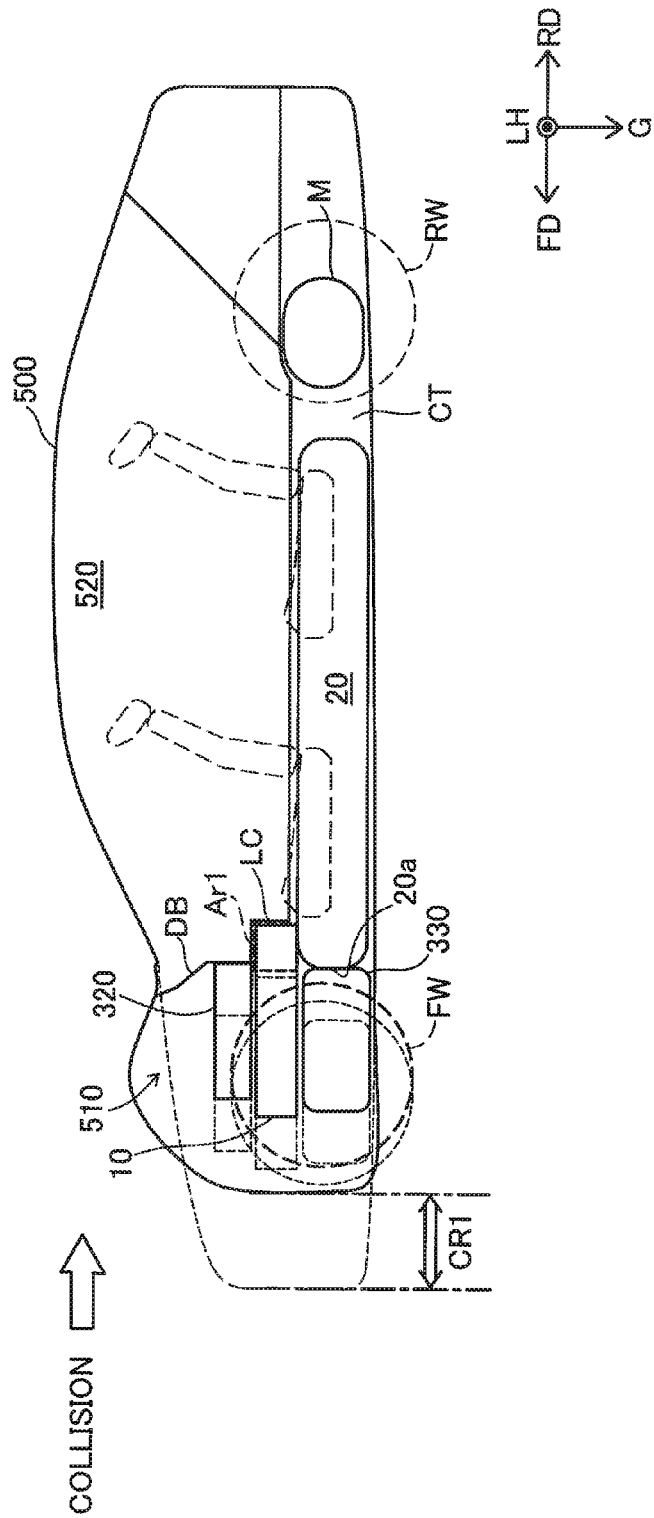
FIG. 5 is a sectional view illustrating the schematic configuration of the fuel cell vehicle in the event of a front collision.

FIG. 5 is a sectional view illustrating the schematic configuration of the fuel cell vehicle 500 in the event of a front collision. The front collision causes the front side of the fuel cell vehicle 500 to be crushed toward the rearward direction RD. The impact of the collision moves the fuel cell 10, the second auxiliary machine 320 and the third auxiliary machine 330 toward the rearward direction RD.

Part of the rear portion of the fuel cell 10 is then received in the receiving space Ar1. Compared with a configuration without the receiving space Ar1, in other words, a configuration that the overlapping portion LC of the dashboard DB is not protruded in the rearward direction RD, this configuration allows for a larger displacement of the fuel cell 10 in the rearward direction RD to such an extent that the fuel cell 10 does not enter the vehicle interior 520 beyond the dashboard DB. This provides high friction during motion, for example, high friction in contact areas of the fuel cell 10 with the second auxiliary machine 320 and the third auxiliary machine 330 that are joined with the fuel cell 10 and thereby reduces the force of the motion of the fuel cell 10. This accordingly suppresses the fuel cell 10 from entering the vehicle interior 520 beyond the dashboard DB. This configuration allows for a large displacement in the rearward direction RD of an apparatus having a relatively large length in the vehicle longitudinal direction, such as the fuel cell 10, and thereby ensures a large space that serves as a crushable zone CR1 in the front room 510 to provide for a front collision. The kinetic energy of the fuel cell vehicle 500 can thus be significantly absorbed by the crush of the front room 510.

A3. Comparative Example

Figure 6:
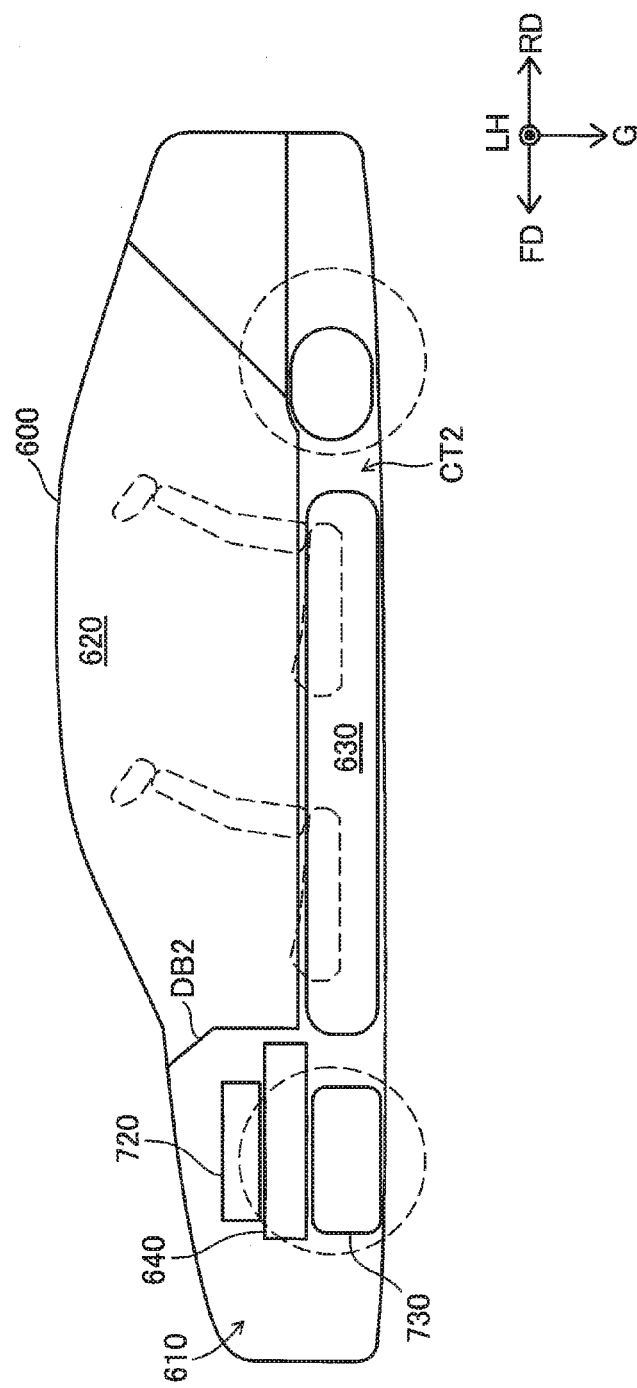
FIG. 6 is a sectional view illustrating the schematic configuration of a fuel cell vehicle according to a comparative example.

FIG. 6 is a sectional view illustrating the schematic configuration of a fuel cell vehicle 600 according to a comparative example. FIG. 6 illustrates a section of the fuel cell vehicle 600 along the forward direction FD and the rearward direction RD of the vehicle at the center position in the vehicle width direction LH in the normal state, like FIG. 1.

The fuel cell vehicle 600 of the comparative example has a front room 610, a vehicle interior 620 and a center tunnel CT2. An upper portion and part of a lower portion of a tank 630 are placed in the center tunnel CT2. A dashboard DB2 of the comparative example differs from the dashboard DB of the above embodiment by the absence of the overlapping portion LC.

The locations of a fuel cell 640, a second auxiliary machine 720 and a third auxiliary machine 730 in the fuel cell vehicle 600 of the comparative example are substantially similar to the locations of the fuel cell 10, the second auxiliary machine 320 and the third auxiliary machine 330 in the above embodiment.

Figure 7:
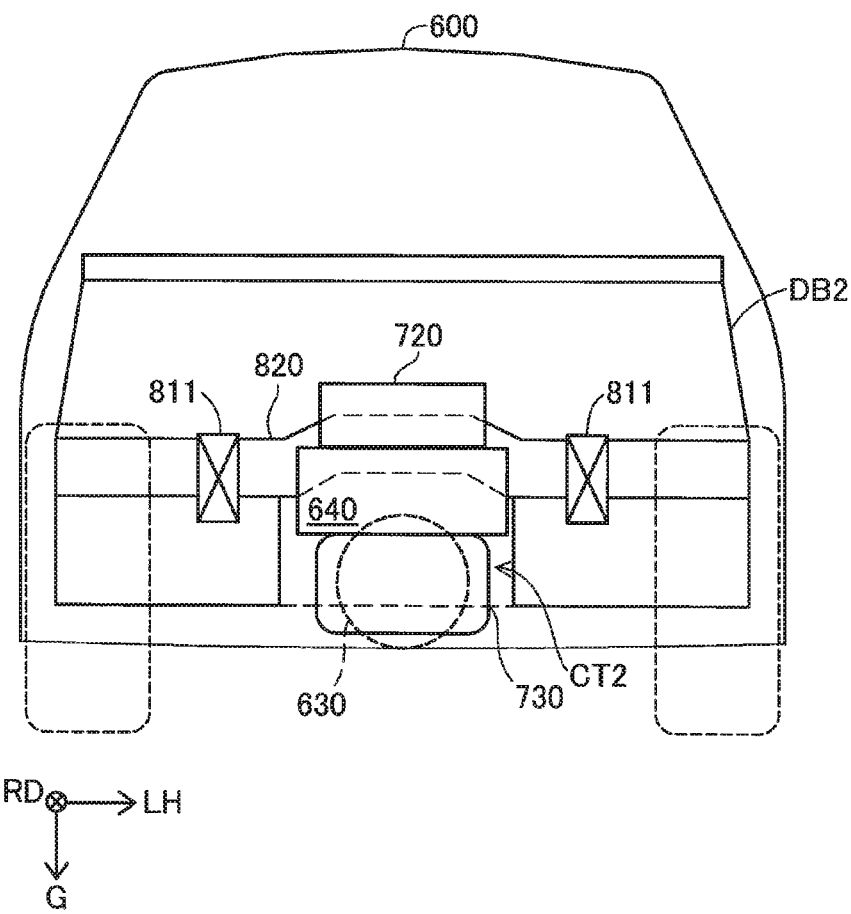
FIG. 7 is a schematic transparent view illustrating the fuel cell vehicle of the comparative example viewed from the vehicle front side.

FIG. 7 is a schematic transparent view illustrating the fuel cell vehicle 600 of the comparative example viewed from the vehicle front side. Like FIG. 2, the transparent view of FIG. 7 illustrates inside of the front room 610 when the fuel cell vehicle 600 is viewed in the rearward direction RD from the vehicle front side.

A reinforcement member 820 is placed adjacent to the dashboard DB2 in the front room 610. The reinforcement member 820 has the similar functions to those of the reinforcement member 420 of the embodiment. The reinforcement member 820 is extended to pass through a pair of side members 811. The reinforcement member 820 overlaps with a rear portion of the fuel cell 640 when the fuel cell vehicle 600 is viewed from the vehicle front side. The reinforcement member 820 also overlaps with the second auxiliary machine 720 when the fuel cell vehicle 600 is viewed from the vehicle front side.

Figure 8:
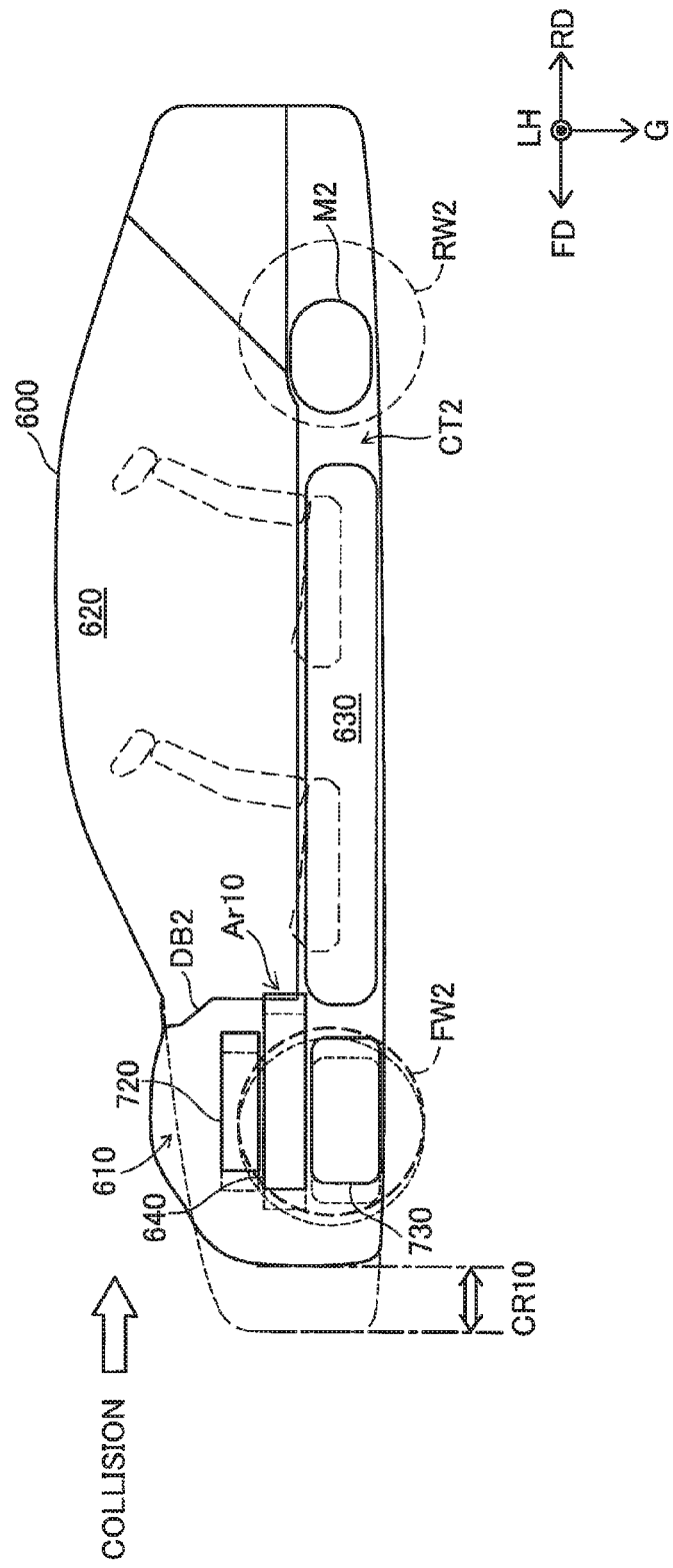
FIG. 8 is a sectional view illustrating the schematic configuration of the fuel cell vehicle of the comparative example in the event of a front collision.

FIG. 8 is a sectional view illustrating the schematic configuration of the fuel cell vehicle 600 of the comparative example in the event of a front collision. The front collision causes the front side of the fuel cell vehicle 600 to be crushed toward the rearward direction RD. The impact of the collision moves the fuel cell 640, the second auxiliary machine 720 and the third auxiliary machine 730 toward the rearward direction RD.

The fuel cell vehicle 600 of the comparative example does not have the receiving space Ar1. This configuration allows for only a small displacement of the fuel cell 640 in the rearward direction RD to such an extent that the fuel cell 640 does not enter the vehicle interior 620 beyond the dashboard DB2. This provides low friction during motion, for example, low friction in contact areas of the fuel cell 640 with the second auxiliary machine 720 and the third auxiliary machine 730 that are joined with the fuel cell 640 and thereby makes it difficult to reduce the force of the motion of the fuel cell 640. There is accordingly a possibility that the fuel cell 640 enters the vehicle chamber 620 beyond the dashboard DB2. This configuration allows for only a small displacement in the rearward direction RD of the fuel cell 640 in the event of a front collision and provides a relatively small space that serves as a crushable zone CR10 in the front room 610 to provide for a front collision. The kinetic energy of the fuel cell vehicle 600 can thus not be significantly absorbed by the crush of the front room 610.

In the fuel cell vehicle 500 of the embodiment described above, on the other hand, the receiving space Ar1 is provided between the rear end of the fuel cell 10 and the overlapping portion LC. This configuration allows for a large displacement of the fuel cell 10 in the rearward direction RD to such an extent that the fuel cell 10 does not enter the vehicle interior 520 beyond the dashboard DB, in the event of a front collision. This reduces the force of the motion of the fuel cell 10 and suppresses the fuel cell 10 from entering the vehicle interior 520. This configuration ensures a large crushable zone to significantly absorb the kinetic energy of the fuel cell vehicle 500.

In the fuel cell vehicle 500 of the first embodiment described above, the receiving space Ar1 is provided between the rear end of the fuel cell 10 and the overlapping portion LC in the normal state. This configuration allows at least part of the rear portion of the fuel cell 10 to be moved and received into the receiving space Ar1, in the event of a front collision. The friction during motion or the like reduces the force of the motion of the fuel cell 10 and suppresses the fuel cell 10 from entering the vehicle interior 520 beyond the dashboard DB. In this state, at least part of the rear portion of the fuel cell 10 is moved to behind the front end 20a of the tank 20. This suppresses the fuel cell 10 from hitting against the tank 20 and thereby suppresses deformation of the tank 20 in the event of a front collision. The remaining portion of the dashboard DB other than the overlapping portion is placed flush with the front end 20a of the tank 20 in the vehicle longitudinal direction or is placed in front of the front end 20a of the tank 20. This configuration suppresses the vehicle interior 520 from being narrowed. The fuel cell 10 and the tank 20 are placed such that the profile of the fuel cell 10 does not overlap with the center axis cx of the tank 20 when the fuel cell vehicle 500 is viewed from the vehicle front side. This configuration suppresses the fuel cell 10 from strongly hitting against the tank 20 when the fuel cell 10 is moved rearward in the event of a front collision.

The reinforcement member 420 is placed not to overlap with the rear portion of the fuel cell 10 when the fuel cell vehicle 500 is viewed from the vehicle front side. This configuration suppresses the reinforcement member 420 from interfering with rearward motion of at least part of the rear portion of the fuel cell 10 in the event of a front collision, while reinforcing the dashboard DB.

The second auxiliary machine 320 is placed above the fuel cell 10 to be adjacent to the fuel cell 10. The third auxiliary machine 330 is placed under the fuel cell 10 to be adjacent to the fuel cell 10. This configuration ensures a larger crushable zone in the front room 510 to provide for a front collision, compared with a configuration that the second and the third auxiliary machines 320 and 330 are placed in front of or behind the fuel cell 10.

The third auxiliary machine 330 having the greater total weight between the second auxiliary machine 320 and the third auxiliary machine 330 is placed under the second auxiliary machine 320. This configuration lowers the center of gravity of the fuel cell vehicle 500 and improves the driving stability.

B. Second Embodiment

Figure 9:
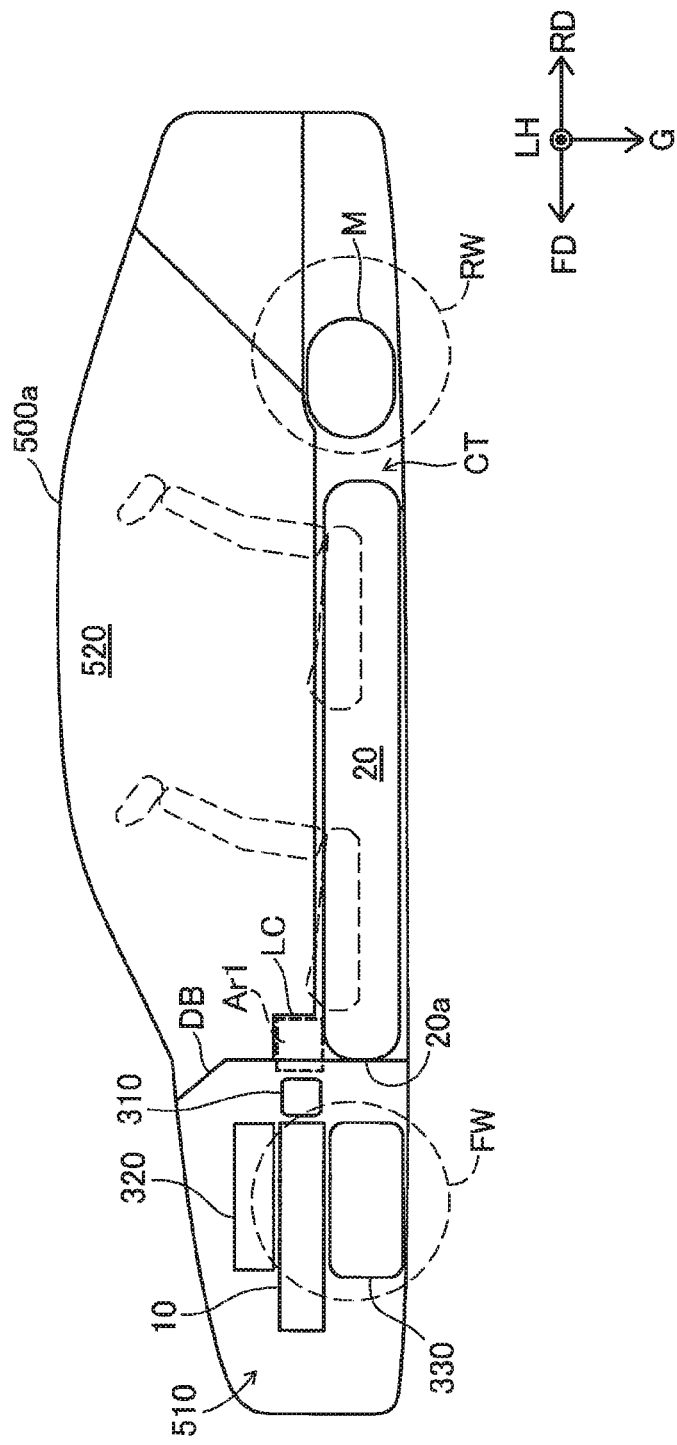
FIG. 9 is a sectional view illustrating the schematic configuration of a fuel cell vehicle according to a second embodiment.
Figure 10:
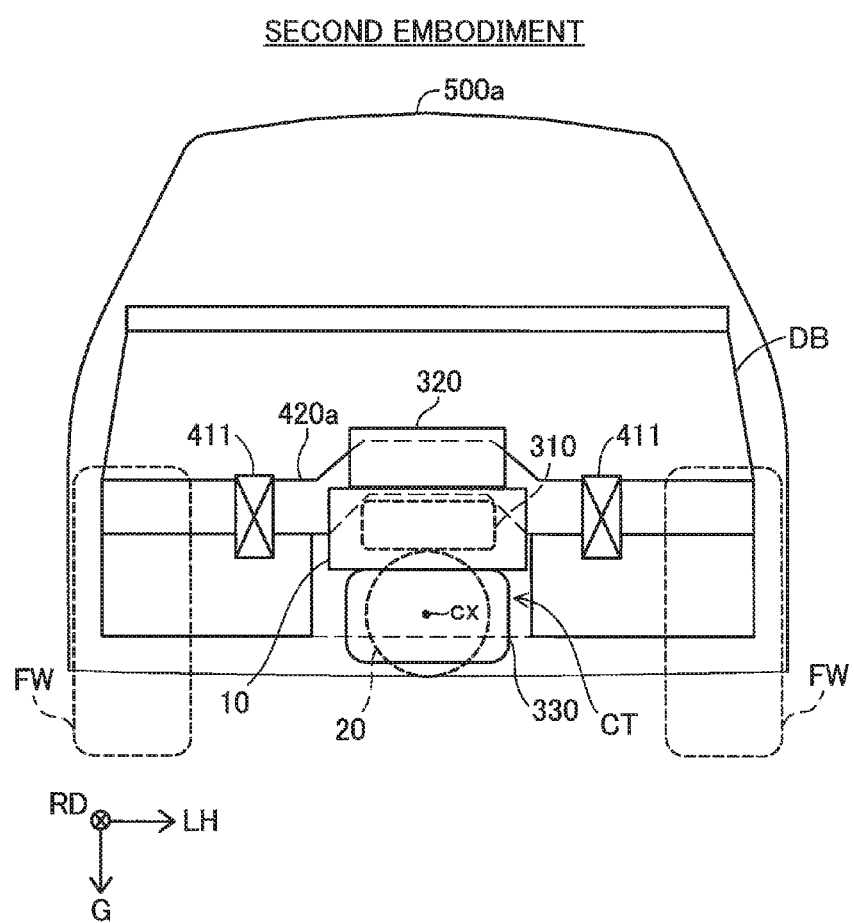
FIG. 10 is a schematic transparent view illustrating the fuel cell vehicle of the second embodiment viewed from the vehicle front side.

FIG. 9 is a sectional view illustrating the schematic configuration of a fuel cell vehicle 500a according to a second embodiment. FIG. 10 is a schematic transparent view illustrating the fuel cell vehicle 500a of the second embodiment viewed from the vehicle front side. The fuel cell vehicle 500a of the second embodiment differs from the fuel cell vehicle 500 of the first embodiment by that a first auxiliary machine 310 is placed behind the fuel cell 10 in the front room 510 and that a reinforcement member 420a is provided in place of the reinforcement member 420. Otherwise the configuration of the fuel cell vehicle 500a of the second embodiment is similar to the configuration of the fuel cell vehicle 500 of the first embodiment. The like components are expressed by the like reference signs and are not specifically described.

According to the second embodiment, the first auxiliary machine 310 is configured by the circulation pump 24. As shown in FIG. 9, the first auxiliary machine 310 is placed behind the fuel cell 10. This configuration causes the overlapping portion LC to overlap with a rear portion of the fuel cell 10 and a rear portion of the first auxiliary machine 310 when the fuel cell vehicle 500a is viewed from the vehicle front side. A receiving space Ar1 is provided between a rear end of the first auxiliary machine 310 and the overlapping portion LC. According to the second embodiment, the receiving space Ar1 is configured to receive at least part of the rear portion of the first auxiliary machine 310 in the event of a front collision of the fuel cell vehicle 500a and to allow this part of the rear portion of the first auxiliary machine 310 to be moved to behind a front end 20a of the tank 20.

As shown in FIG. 10, the reinforcement member 420a differs from the reinforcement member 420 of the first embodiment by that an approximate center portion in the vehicle width direction LH of the reinforcement member 420a has a smaller amount of upward protrusion. Accordingly the reinforcement member 420a overlaps with the rear portion of the fuel cell 10 when the fuel cell vehicle 500a is viewed from the vehicle front side. The reinforcement member 420a also overlaps with a rear portion of the second auxiliary machine 320. The reinforcement member 420a, however, does not overlap with the first auxiliary machine 310 when the fuel cell vehicle 500a is viewed from the vehicle front side. This configuration suppresses the reinforcement member 420a from interfering with rearward motion of the first auxiliary machine 310 in the event of a front collision.

The first auxiliary machine 310 and the tank 20 are placed such that the profile of the first auxiliary machine 310, i.e., the contour of the first auxiliary machine 310 and an area surrounded by the contour, does not overlap with a center axis cx of the tank 20 when the fuel cell vehicle 500a is viewed from the vehicle front side. In the fuel cell vehicle 500a, this configuration suppresses the first auxiliary machine 310 from strongly hitting against the tank 20 when the first auxiliary machine 310 is moved rearward in the event of a front collision.

Figure 11:
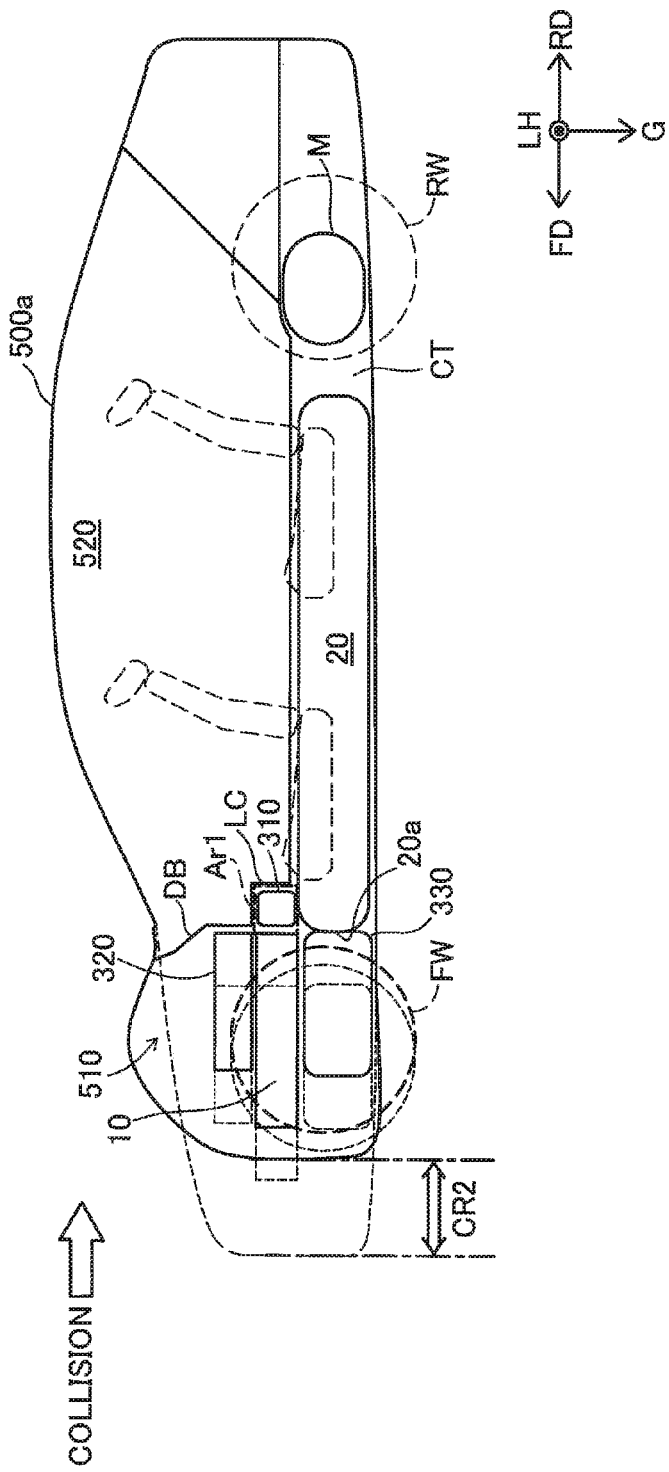
FIG. 11 is a sectional view illustrating the schematic configuration of the fuel cell vehicle of the second embodiment in the event of a front collision.

FIG. 11 is a sectional view illustrating the schematic configuration of the fuel cell vehicle 500a of the second embodiment in the event of a front collision. The front collision causes the front side of the fuel cell vehicle 500a to be crushed toward the rearward direction RD. The impact of the collision moves the fuel cell 10, the first auxiliary machine 310, the second auxiliary machine 320 and the third auxiliary machine 330 toward the rearward direction RD.

Part of the rear portion of the first auxiliary machine 310 is then received in the receiving space Ar1. Compared with a configuration without the receiving space Ar1, in other words, a configuration that the overlapping portion LC of the dashboard DB is not protruded in the rearward direction RD, this configuration allows for a larger displacement of the first auxiliary machine 310 in the rearward direction RD to such an extent that the first auxiliary machine 310 does not enter the vehicle interior 520 beyond the dashboard DB. This provides high friction during motion, for example, high friction in a contact area of the first auxiliary machine 310 with the fuel cell 10 that is joined with the first auxiliary machine 310 and thereby reduces the force of the motion of the first auxiliary machine 310. This accordingly suppresses the first auxiliary machine 310 from entering the vehicle interior 520 beyond the dashboard DB. This configuration allows for a large displacement of the first auxiliary machine 310 and thereby ensures a large space that serves as a crushable zone CR2 in the front room 510 to provide for a front collision. The kinetic energy of the fuel cell vehicle 500a can thus be significantly absorbed by the crush of the front room 510.

The fuel cell vehicle 500a of the second embodiment described above has the similar advantageous effects to those of the fuel cell vehicle 500 of the first embodiment. More specifically, the configuration of the second embodiment allows at least part of the rear portion of the first auxiliary machine 310 to be moved and received into the receiving space Ar1, in the event of a front collision. The friction during motion or the like reduces the force of the motion of the first auxiliary machine 310 and suppresses the first auxiliary machine 310 from entering the vehicle interior 520 beyond the dashboard DB. This configuration also suppresses the first auxiliary machinery 310 from hitting against the tank 20 and suppresses the vehicle interior 520 from being narrowed. The configuration of the second embodiment suppresses the reinforcement member 420a from interfering with rearward motion of at least part of the rear portion of the first auxiliary machine 310 in the event of a front collision, while reinforcing the dashboard DB. Additionally, the configuration of the second embodiment ensures a larger crushable zone in the front room 510 to provide for a front collision, compared with a configuration that the second and the third auxiliary machines 320 and 330 are placed in front of the fuel cell 10. In the configuration of the second embodiment, the third auxiliary machine 330 having the greater total weight is placed under the second auxiliary machine 320. This configuration lowers the center of gravity of the fuel cell vehicle 500a and improves the driving stability.

C. Modifications

C1. Modification 1

In the respective embodiments described above, the upper portion of the dashboard DB is bent forward. According to a modification, the upper portion of the dashboard DB may be bent rearward, instead of forward. According to another modification, the upper portion of the dashboard DB may not be bent but may be arranged to be flush with the lower portion in the vehicle longitudinal direction. As clearly understood from the above embodiments and these modifications, a dashboard having at least part of the remaining portion, other than the overlapping portion LC, that is placed flush with the front end 20a of the tank 20 in the vehicle longitudinal direction or is placed in front of the front end 20a of the tank 20 is applicable to the fuel cell vehicle of the disclosure.

C2. Modification 2

In each of the embodiments described above, the fuel cell vehicle 500 or 500a includes the reinforcement member 420 or 420a. The reinforcement member 420 or 420 may, however, be omitted. A configuration with omission of the reinforcement member 420 is free from interference of the reinforcement member 420 with rearward motion of the fuel cell 10, like the configuration of the first embodiment. Similarly a configuration with omission of the reinforcement member 420a is free from interference of the reinforcement member 420a with rearward motion of the first auxiliary machine 310, like the configuration of the second embodiment.

C3. Modification 3

In the respective embodiments described above, part of the lower portion of the tank 20 is exposed under the center tunnel CT. According to a modification, the tank 20 may be fully placed in the center tunnel CT. In the respective embodiments, the gas stored in the tank 20 is hydrogen gas. In the case where another type of gas is used as the reactive gas of the fuel cell, the tank 20 may be configured to store this another type of gas. In general, a tank that is at least partly placed in the center tunnel CT provided under the floor of the fuel cell vehicle 500 or 500a and is configured to store a gas that is to be supplied to the fuel cell 10 is applicable to the fuel cell vehicle of the disclosure.

C4. Modification 4

In the second embodiment described above, the first auxiliary machine 310 is configured by the circulation pump 24. The first auxiliary machine 310 is, however, not limited to the circulation pump 24 but may be configured by another type of auxiliary machine. Similarly, the second auxiliary machine 320 and the third auxiliary machine 330 may be configured by different types of auxiliary machines from those described in the above embodiments. The first auxiliary machine 310, the second auxiliary machine 320 and the third auxiliary machine 330 may include auxiliary machines that are not directly involved in operation of the fuel cell system 100, in place of or in addition to the auxiliary machines that are directly involved in operation of the fuel cell system 100. An example of the former auxiliary machine is, for example, a compressor for air conditioning. In the respective embodiments described above, the total weight of the third auxiliary machine 330 is greater than the total weight of the second auxiliary machine 320. According to a modification, the total weight of the third auxiliary machine 330 may be equal to or less than the total weight of the second auxiliary machine 320.

C5. Modification 5

The configurations of the first embodiment and the second embodiment have the identical size of the receiving space Ar1. The disclosure is, however, not limited to these configurations. The size of the receiving space Ar1 may be set according to the volume of an apparatus (portion) that is to be received in a receiving space in the event of a front collision. For example, when the volume of the rear portion of the first auxiliary machine 310 that is received in the receiving space in the event of a front collision in the second embodiment is smaller than the volume of the rear portion of the fuel cell 10 that is received in the receiving space in the event of a front collision in the first embodiment, the size of the receiving space Ar1 of the second embodiment may be set smaller than the size of the receiving space Ar1 of the first embodiment.

C6. Modification 6

The fuel cell vehicles 500 and 500a of the respective embodiments described above are equipped with only the motor M as the power source. The disclosure is also applicable to a vehicle that is equipped with an internal combustion engine such as gasoline engine, in addition to the motor M.

The disclosure is not limited to any of the embodiments and the modifications described above but may be implemented by a diversity of other configurations without departing from the scope of the disclosure. For example, the technical features of any of the embodiments and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A fuel cell vehicle that is configured to include a front room and a vehicle interior, the fuel cell vehicle comprising:
 a fuel cell that is placed in the front room;
 a center tunnel that is provided under floor of the fuel cell vehicle;
 a tank that is at least partly placed in the center tunnel and is configured to store a gas that is to be supplied to the fuel cell; and
 a dashboard that is configured to separate the front room from the vehicle interior, wherein
 the fuel cell is placed above the tank such that a profile of the fuel cell does not overlap with a center axis of the tank when the fuel cell vehicle is viewed from a vehicle front side,
 the dashboard has an overlapping portion that is arranged to overlap with a rear portion of the fuel cell when the fuel cell vehicle is viewed from the vehicle front side and that is located behind a front end of the tank,
 at least part of a remaining portion of the dashboard other than the overlapping portion is placed flush with the front end of the tank in a vehicle longitudinal direction or is placed in front of the front end of the tank, and
 in a normal state without a collision, a receiving space is provided between a rear end of the fuel cell and the overlapping portion of the dashboard and is configured to allow at least part of the rear portion of the fuel cell to be moved to behind the front end of the tank in the event of a front collision of the fuel cell vehicle.

2. The fuel cell vehicle according to claim 1, further comprising:
 a reinforcement member that is placed on a front room side to be adjacent to the dashboard, wherein
 the reinforcement member is disposed not to overlap with the rear portion of the fuel cell when the fuel cell vehicle is viewed from the vehicle front side.

3. A fuel cell vehicle that is configured to include a front room and a vehicle interior, the fuel cell vehicle comprising:
 a fuel cell that is placed in the front room;
 a first auxiliary machine that is placed behind the fuel cell in the front room;
 a center tunnel that is provided under floor of the fuel cell vehicle;

a tank that is at least partly placed in the center tunnel and is configured to store a gas that is to be supplied to the fuel cell; and a dashboard that is configured to separate the front room from the vehicle interior, wherein the first auxiliary machine and the tank are disposed such that a profile of the first auxiliary machine does not overlap with a center axis of the tank when the fuel cell vehicle is viewed from a vehicle front side, the dashboard has an overlapping portion that is arranged to overlap with a rear portion of the first auxiliary machine when the fuel cell vehicle is viewed from the vehicle front side and that is located behind a front end of the tank, at least part of a remaining portion of the dashboard other than the overlapping portion is placed flush with the front end of the tank in a vehicle longitudinal direction or is placed in front of the front end of the tank, and in a normal state without a collision, a receiving space is provided between a rear end of the first auxiliary machine and the overlapping portion of the dashboard and is configured to allow at least part of the rear portion of the first auxiliary machine to be moved to behind the front end of the tank in the event of a front collision of the fuel cell vehicle.

4. The fuel cell vehicle according to claim 3, further comprising:

a reinforcement member that is placed on a front room side to be adjacent to the dashboard, wherein the reinforcement member is disposed not to overlap with the rear portion of the first auxiliary machine when the fuel cell vehicle is viewed from the vehicle front side.

5. The fuel cell vehicle according to claim 1, further comprising:

a second auxiliary machine that is placed above the fuel cell to be adjacent to the fuel cell; and a third auxiliary machine that is placed under the fuel cell to be adjacent to the fuel cell.

6. The fuel cell vehicle according to claim 5, wherein the third auxiliary machine has a total weight greater than a total weight of the second auxiliary machine.

7. The fuel cell vehicle according to claim 3, further comprising:

a second auxiliary machine that is placed above the fuel cell to be adjacent to the fuel cell; and a third auxiliary machine that is placed under the fuel cell to be adjacent to the fuel cell.

8. The fuel cell vehicle according to claim 7, wherein the third auxiliary machine has a total weight greater than a total weight of the second auxiliary machine.

* * * * *